United States Patent
Shiizaki et al.

(10) Patent No.: US 9,974,106 B2
(45) Date of Patent: May 15, 2018

(54) BASE STATION APPARATUS, MOBILE STATION APPARATUS, RADIO COMMUNICATION SYSTEM, COMMUNICATION CONTROL METHOD OF BASE STATION APPARATUS, AND COMMUNICATION CONTROL METHOD OF MOBILE STATION APPARATUS

(71) Applicant: FUJITSU LIMITED, Kawasaki-shi, Kanagawa (JP)

(72) Inventors: Kotaro Shiizaki, Kawasaki (JP); Yoshinori Tanaka, Yokohama (JP); Daisuke Jitsukawa, Adachi (JP); Yoshihiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/383,398

(22) Filed: Dec. 19, 2016

(65) Prior Publication Data
US 2017/0099692 A1    Apr. 6, 2017

Related U.S. Application Data

(63) Continuation of application No. PCT/JP2014/066905, filed on Jun. 25, 2014.

(51) Int. Cl.
*H04W 76/02* (2009.01)
*H04W 4/02* (2018.01)
*H04W 48/08* (2009.01)

(52) U.S. Cl.
CPC ......... *H04W 76/023* (2013.01); *H04W 4/021* (2013.01); *H04W 48/08* (2013.01)

(58) Field of Classification Search
USPC ........................................................ 455/452
See application file for complete search history.

(56) References Cited

U.S. PATENT DOCUMENTS

2009/0325625 A1    12/2009    Hugl et al.
2010/0240312 A1    9/2010    Peng et al.
(Continued)

FOREIGN PATENT DOCUMENTS

EP    2 863 687 A1    4/2015
RU    2 503 153 C2    12/2013
(Continued)

OTHER PUBLICATIONS

Intel Corporation, "Discussion on D2D Operation within Network Coverage(Mode-1)", Agenda Item: 7.2.7.2.2, 3GPP TSG-RAN WG1 Meeting #76bis, R1-141164, Shenzhen, China, Mar. 31-Apr. 4, 2014, cited in ISR for PCT/JP2014/066905.
(Continued)

*Primary Examiner* — Edan Orgad
*Assistant Examiner* — Emmanuel Maglo
(74) *Attorney, Agent, or Firm* — Myers Wolin, LLC

(57) ABSTRACT

A base station apparatus includes a processor. The processor executes a process including obtaining information indicating a radio status of each mobile station apparatus relevant to first communication in which radio communication is performed between the mobile station apparatuses via the base station apparatus, and second communication in which radio communication is directly performed between the mobile station apparatuses without via the base station apparatus; and notifying, based on the obtained information, the mobile station apparatuses that perform the second communication of control information for controlling the second communication.

14 Claims, 11 Drawing Sheets

(56) References Cited

U.S. PATENT DOCUMENTS

| | | |
|---|---|---|
| 2011/0244899 A1 | 10/2011 | Li et al. |
| 2012/0314600 A1 | 12/2012 | Zeira |
| 2013/0157676 A1* | 6/2013 | Baek ................. H04W 72/0486 455/452.1 |
| 2013/0316762 A1* | 11/2013 | Charbit ............... H04W 76/023 455/552.1 |
| 2014/0087744 A1* | 3/2014 | Yang ................... H04W 76/043 455/450 |
| 2014/0355483 A1* | 12/2014 | Jang ........................ H04W 8/26 370/254 |
| 2015/0078270 A1* | 3/2015 | Seo ....................... H04W 52/46 370/329 |
| 2015/0078279 A1* | 3/2015 | Ko ........................ H04L 1/1861 370/329 |
| 2015/0103789 A1 | 4/2015 | Tanaka |
| 2015/0172037 A1 | 6/2015 | Morita |
| 2015/0208453 A1 | 7/2015 | Yamazaki et al. |
| 2015/0257184 A1* | 9/2015 | Yamazaki ........... H04W 76/023 370/329 |
| 2016/0227578 A1* | 8/2016 | Lee ..................... H04W 74/004 |

FOREIGN PATENT DOCUMENTS

| | | |
|---|---|---|
| WO | 2013/179472 A1 | 12/2013 |
| WO | 2014/007494 A1 | 1/2014 |
| WO | 2014/017498 A1 | 1/2014 |
| WO | 2014/026517 A1 | 2/2014 |
| WO | 2014/034572 A1 | 3/2014 |

OTHER PUBLICATIONS

Intel Corporation, "Resource allocation signaling for D2D communication", Agenda Item: 7.4.2, 3GPP TSG-RAN WG2 Meeting =85bis, R2-141223, Valencia, Spain, Mar. 31-Apr. 4, 2014, cited in ISR for PCT/JP2014/066905.

Extended European search report with supplementary European search report and the European search opinion issued by the European Patent Office for corresponding European Patent Application No. 14895919.0, dated Aug. 8, 2017.

Gu, et al.,"Dynamic Power Control Mechanism for Interference Coordination of Device-to-Device Communication in Cellular Networks", Sungkyunkwan University, IEEE Ubiquitous and Future Networks (ICUFN), 2011 Third International Conference, Jun. 15-17, 2011, IEEE Copyright 2011.

International Search Report issued for corresponding International Patent Application No. PCT/JP2014/066905, dated Sep. 30, 2014, with an English translation.

HTC, "Construction of D2D group-cast communication in public safety scenario", Agenda Item: 7.2.8.1, 3GPP TSG-RAN WG1 Meeting =74, R1-133263, Barcelona, Spain, Aug. 19-23, 2013, cited in ISR for PCT/JP2014/066905.

Intel Corporation, "Resource allocation signaling for D2D communication", Agenda Item: 7.2.7.2.2, 3GPP TSG-RAN WG1 Meeting =76bis, R1-141164, Shenzhen, China, Mar. 31-Apr. 4, 2014, cited in ISR for PCT/JP2014/066905.

Intel Corporation, "Discussion on D2D Operation within Network Coverage(Mode-1)", Agenda Item: 7.4.2, 3GPP TSG-RAN WG2 Meeting =85bis, R2-141223, Valencia, Spain, Mar. 31-Apr. 4, 2014, cited in ISR for PCT/JP2014/066905.

Written Opinion of the International Searching Authority issued for corresponding International Patent Application No. PCT/JP2014/066905, dated Sep. 30, 2014, with an English translation.

Notice of Preliminary Rejection issued by the Korean Intellectual Property Office for corresponding Korean Patent Application No. 10-2016-7035532, dated Jul. 19, 2017, with English translation.

Examination report issued by IP Australia for corresponding Australian Patent Application No. 2014398417, dated Aug. 25, 2017.

Partial supplementary European search report issued by the European Patent Office for corresponding European Patent Application No. 14895919.0, dated Apr. 10, 2017.

Notification of Reasons for Refusal issued by the Japan Patent Office for corresponding Japanese Patent Application No. 2016-528810, dated Jan. 16, 2018, with an English translation.

Office Action issued by Rospatent Federal Service for Intellectual Property for corresponding Russian Patent Application No. 2017101993/08(003437), dated Jan. 18, 2018, with an English translation.

Office Action issued by the Canadian Intellectual Property Office for corresponding Canadian Patent Application No. 2,953,078, dated Nov. 1, 2017.

Notice of Final Rejection issued by the Korean Intellectual Property Office for corresponding Korean Patent Application No. 10-2016-7035532, dated Dec. 27, 2017, with English translation.

* cited by examiner

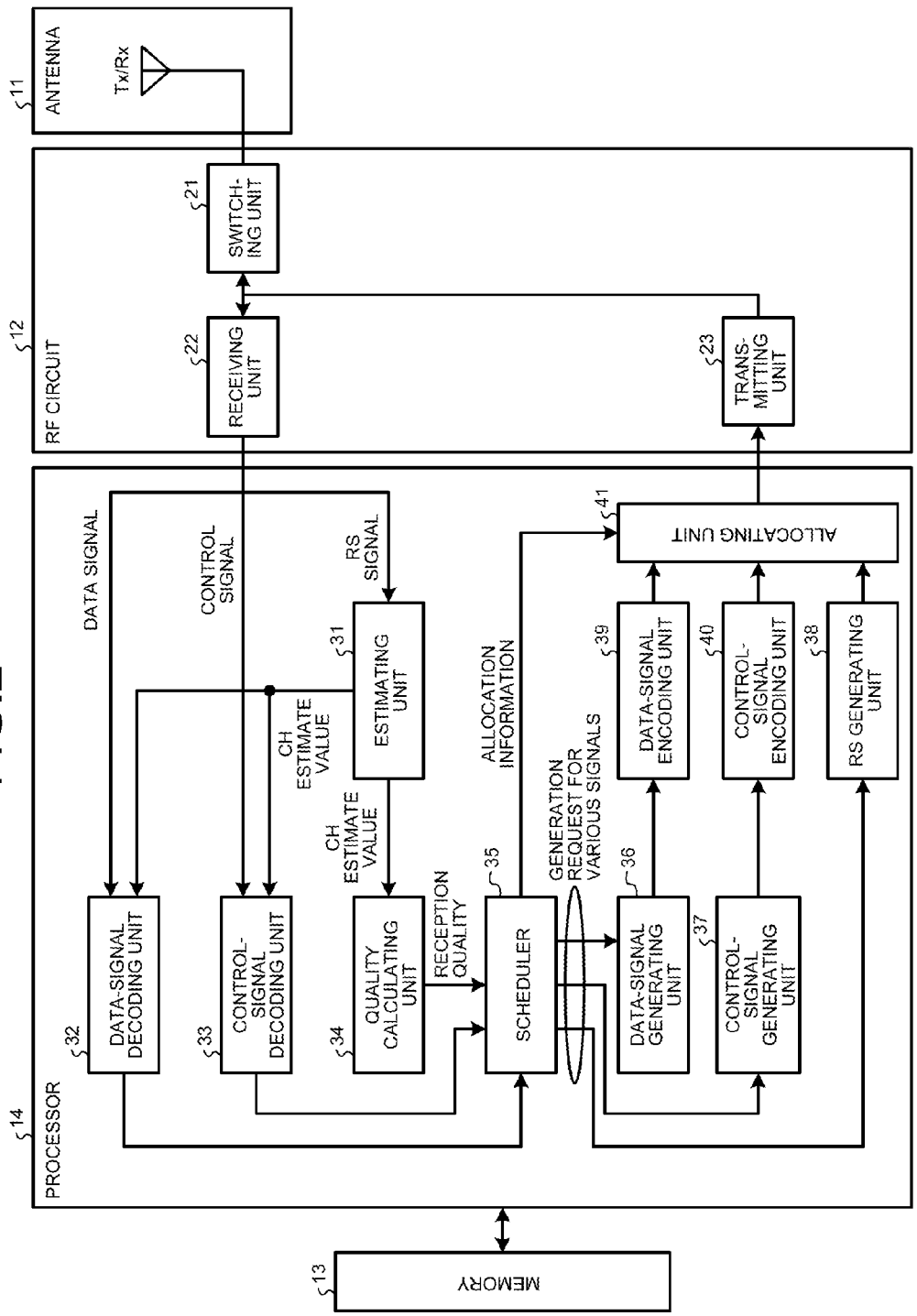

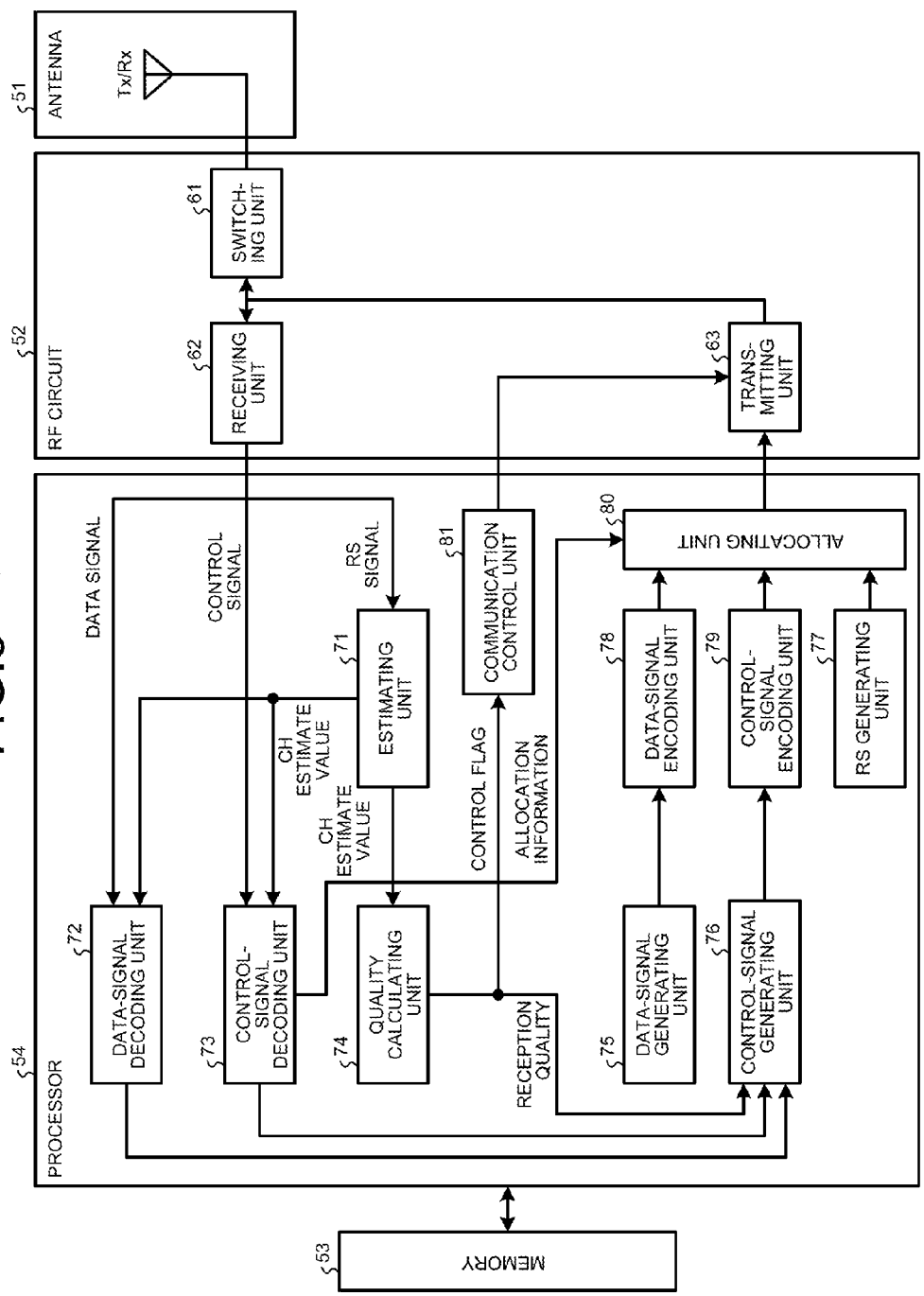

FIG.4

| | INFORMATION | BIT NUMBER |
|---|---|---|
| 91 | Carrier Indicator | 0 or 3 |
| 92 | Flag for format0/format1A differentiation | 1 |
| 93 | Frequency hopping flag | 1 |
| 94 | Resource block assignment and hopping resource allocation | $\left[\log_2\left(N_{RB}^{UL}\left(N_{RB}^{UL}+1\right)/2\right)\right]$ MAXIMUM 12 |
| 95 | Modulation and coding scheme and redundancy version | 5 |
| 96 | New data indicator | 1 |
| 97 | TPC command for scheduled PUSCH | 2 |
| 98 | Cyclic shift for DM RS and OCC index | 3 |
| 99 | UL index | 2 |
| 100 | Downlink Assignment Index (DAI) | 2 |
| 101 | CSI requests | 1 or 2 |
| 102 | Resource allocation type | 1 |
| 103 | D2D COMMUNICATION CONTROL FLAG (FOR NUMBER OF UEs) | NUMBER OF UEs |

FIG.9

| | INFORMATION | BIT NUMBER |
|---|---|---|
| 91 | Carrier Indicator | 0 or 3 |
| 92 | Flag for format0/format1A differentiation | 1 |
| 93 | Frequency hopping flag | 1 |
| 94 | Resource block assignment and hopping resource allocation | $\left\lceil \log_2 \left( N_{RB}^{UL}(N_{RB}^{UL}+1)/2 \right) \right\rceil$ MAXIMUM 12 |
| 95 | Modulation and coding scheme and redundancy version | 5 |
| 96 | New data indicator | 1 |
| 97 | TPC command for scheduled PUSCH | 2 |
| 98 | Cyclic shift for DM RS and OCC index | 3 |
| 99 | UL index | 2 |
| 100 | Downlink Assignment Index (DAI) | 2 |
| 101 | CSI requests | 1 or 2 |
| 102 | Resource allocation type | 1 |
| 103A | D2D COMMUNICATION CONTROL FLAG (UNIT OF SUB-FRAME) | 1 |

| | INFORMATION | BIT NUMBER |
|---|---|---|
| 91 | Carrier Indicator | 0 or 3 |
| 92 | Flag for format0/format1A differentiation | 1 |
| 93 | Frequency hopping flag | 1 |
| 94 | Resource block assignment and hopping resource allocation | $\left[\log_2\left(N_{RB}^{UL}\left(N_{RB}^{UL}+1\right)/2\right)\right]$ MAXIMUM 12 |
| 95 | Modulation and coding scheme and redundancy version | 5 |
| 96 | New data indicator | 1 |
| 97 | TPC command for scheduled PUSCH | 2 |
| 98 | Cyclic shift for DM RS and OCC index | 3 |
| 99 | UL index | 2 |
| 100 | Downlink Assignment Index (DAI) | 2 |
| 101 | CSI requests | 1 or 2 |
| 102 | Resource allocation type | 1 |
| 103B | FUTURE D2D COMMUNICATION CONTROL FLAG (UNIT OF SUB-FRAME) | NUMBER OF SPECIFIED SUB-FRAMES |

90B

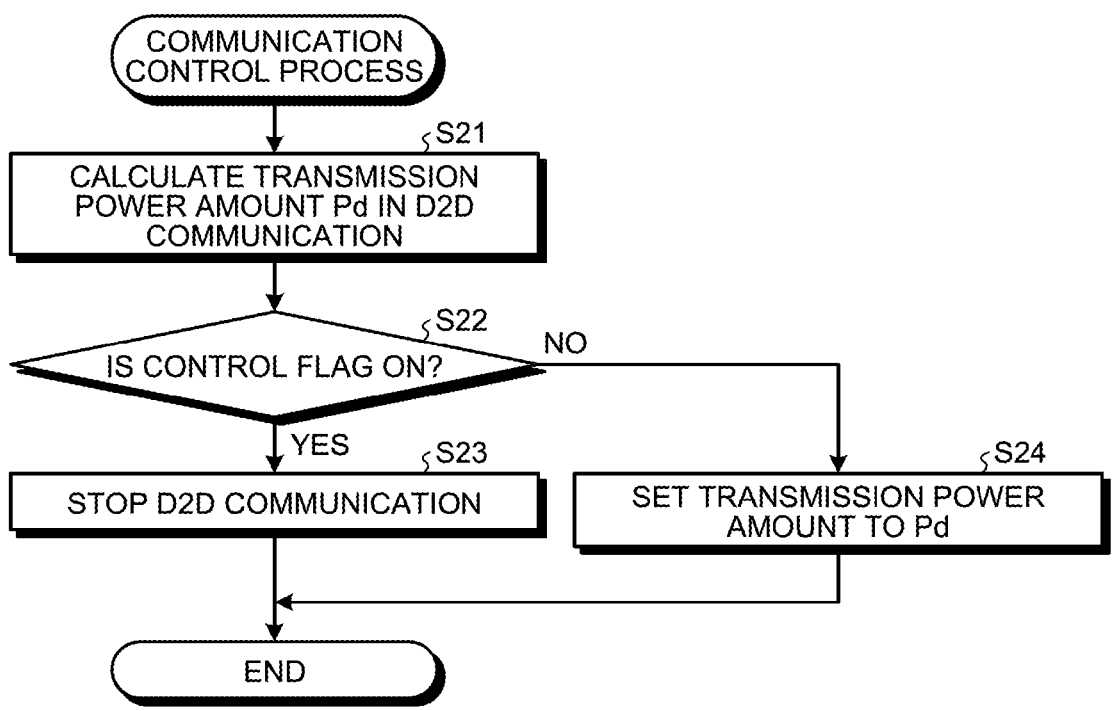

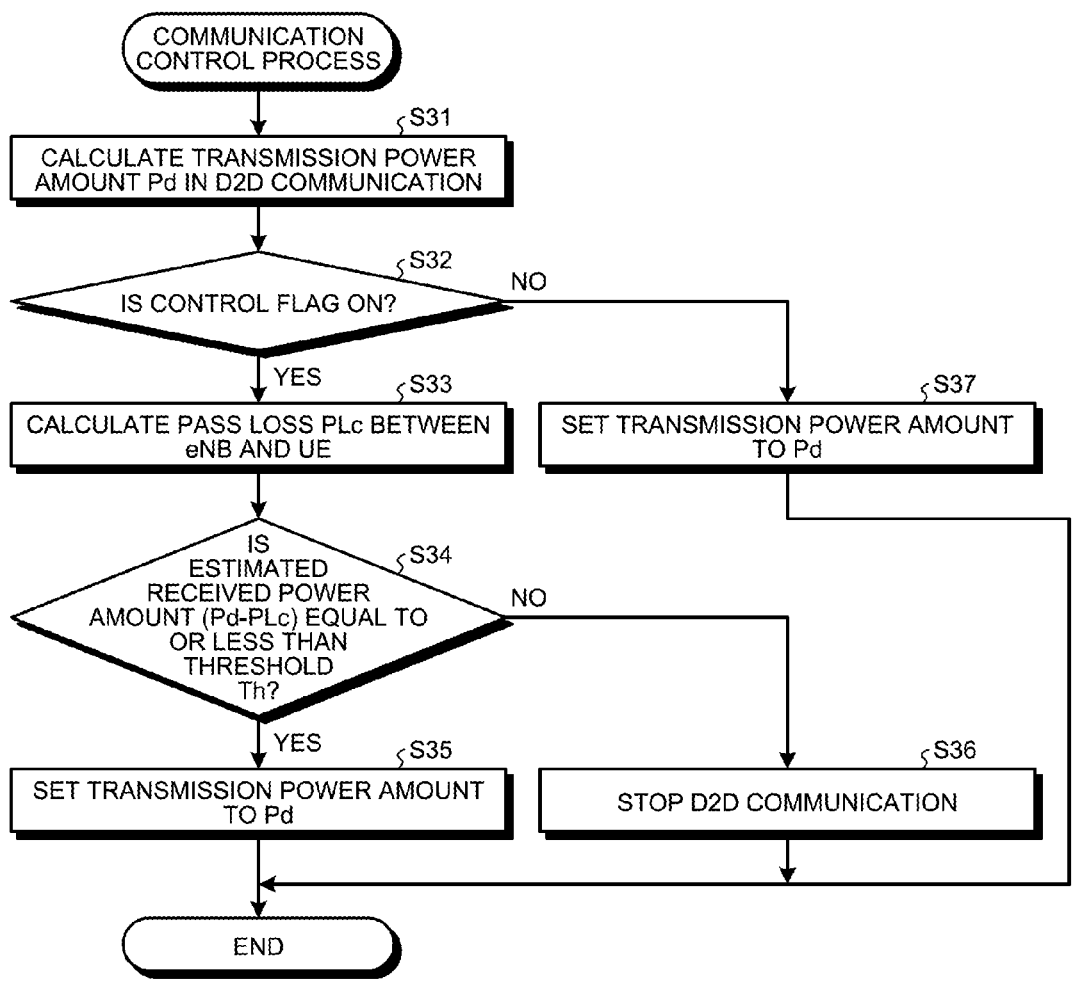

BASE STATION APPARATUS, MOBILE STATION APPARATUS, RADIO COMMUNICATION SYSTEM, COMMUNICATION CONTROL METHOD OF BASE STATION APPARATUS, AND COMMUNICATION CONTROL METHOD OF MOBILE STATION APPARATUS

CROSS-REFERENCE TO RELATED APPLICATION

This application is a continuation application of International Application PCT/JP2014/066905, filed on Jun. 25, 2014, and designating the U.S., the entire contents of which are incorporated herein by reference.

FIELD

The present invention relates to a base station apparatus, a mobile station apparatus, a radio communication system, a communication control method of a base station apparatus, and a communication control method of a mobile station apparatus.

BACKGROUND

In recent years, D2D (Device to Device) communication that is direct communication in which mobile stations directly perform radio communication with each other without via a base station has been known, other than cellular communication that is normal communication in which mobile stations perform radio communication with each other via a base station. The mobile station functions as a CUE (Cellular User Equipment) when being used in the cellular communication, and functions as a DUE (D2D User Equipment) when being used in the D2D communication.

As a future system model, the base station (eNB: eNodeB) allocates radio resources to the CUE and the DUE so that the CUE and the DUE can coexist with each other.

Patent Literature 1: US Patent Application Publication No. 2009/0325625

Non Patent Document 1: "Dynamic Power Control Mechanism for Interference Coordination of Device-to-Device Communication in Cellular Networks", Sungkyunkwan University, IEEE Ubiquitous and Future Networks (ICUFN), 2011 Third International Conference, 15-17 Jun. 2011.

However, for example, when the CUE and the DUE share the same radio resources with each other, it is assumed that the D2D communication interferes with a UL (Up Link) signal from the CUE. That is, the effects of signal interference with the cellular communication due to the D2D communication are significant.

SUMMARY

According to an aspect of the embodiments, a base station apparatus includes a control unit that, based on information indicating a radio status of each mobile station apparatus relevant to first communication in which radio communication is performed between the mobile station apparatuses via the base station apparatus, and second communication in which radio communication is directly performed between the mobile station apparatuses without via the base station apparatus, notifies the mobile station apparatuses that perform the second communication of control information for controlling the second communication.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a block diagram illustrating an example of an eNB according to the first embodiment.

FIG. 3 is a block diagram illustrating an example of a UE according to the first embodiment.

FIG. 4 is an explanatory diagram illustrating an example of a DCI format added with a control flag according to the first embodiment.

FIG. 9 is an explanatory diagram illustrating an example of a DCI format added with a control flag according to a fourth embodiment.

FIG. 10 is an explanatory diagram illustrating an example of a DCI format added with a control flag according to a fifth embodiment.

FIG. 11 is a flowchart illustrating an example of a processing operation of a DUE associated with a communication control process according to a sixth embodiment.

FIG. 12 is a flowchart illustrating an example of a processing operation of a DUE associated with a communication control process according to a seventh embodiment.

DESCRIPTION OF EMBODIMENTS

Exemplary embodiments of a base station apparatus, a mobile station apparatus, a radio communication system, a communication control method of a base station apparatus, and a communication control method of a mobile station apparatus disclosed in the present application will be explained below in detail based on the accompanying drawings. The disclosed techniques are not limited to the embodiments. The following embodiments can be combined as appropriate without causing any contradiction.

First Embodiment

Figure 1:
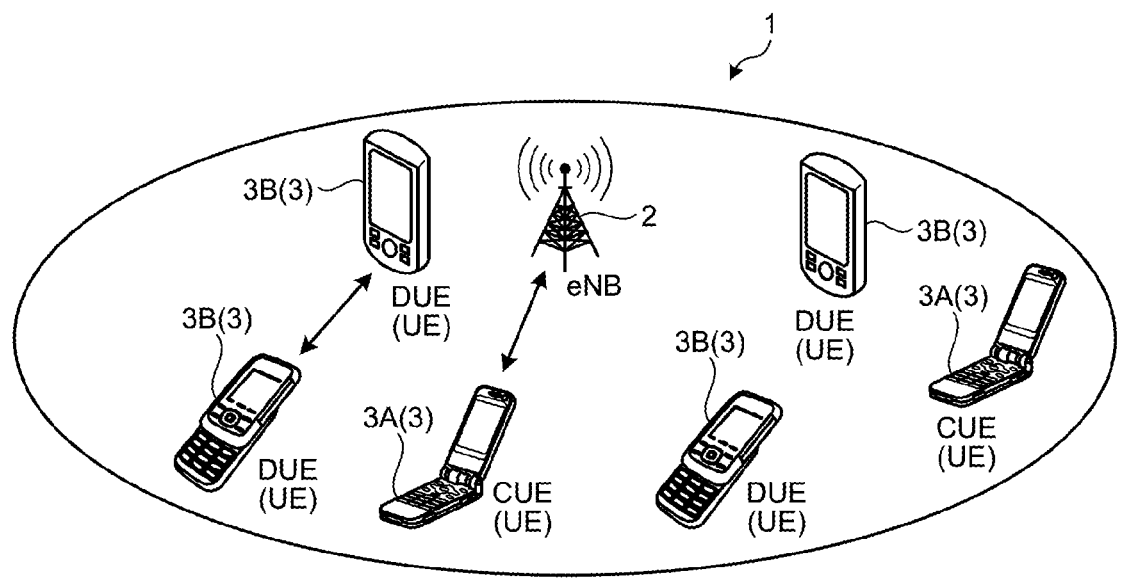
FIG. 1 is an explanatory diagram illustrating an example of a radio system according to a first embodiment.

FIG. 1 is an explanatory diagram illustrating an example of a radio system according to a first embodiment. A radio system 1 illustrated in FIG. 1 includes an eNB 2 and a plurality of UEs (User Equipments) 3. The UE 3 has a function of enabling to switchably perform first communication such as cellular communication or second communication such as D2D communication. The UE 3 functions as a CUE 3A when being used in cellular communication, and functions as a DUE 3B when being used in D2D communication. In the radio system 1, it is assumed that the CUE 3A and the DUE 3B are in an environment in which the CUE 3A and the DUE 3B can be used and coexist with each other.

FIG. 2 is a block diagram illustrating an example of the eNB 2 according to the first embodiment. The eNB 2 illustrated in FIG. 2 includes an antenna 11, an RF (Radio Frequency) circuit 12, a memory 13, and a processor 14. The antenna 11 transmits and receives a radio signal in the cellular communication or the D2D communication. The RF circuit 12 performs various types of signal processing with respect to a radio signal transmitted and received by the antenna 11. The memory 13 is a region for storing various pieces of information. The processor 14 controls the entire eNB 2.

The RF circuit 12 includes a switching unit 21, a receiving unit 22, and a transmitting unit 23. The switching unit 21 is a switch that switches the receiving unit 22 and the transmitting unit 23 between the antenna 11 and the eNB 2. The receiving unit 22 is a communication interface that receives a radio signal in the cellular communication or the D2D communication. The transmitting unit 23 is a communication interface that transmits a radio signal in the cellular communication or the D2D communication. The memory 13 stores radio resources such as a usable frequency and the like associated with the cellular communication or the D2D communication, as well as allocation information for managing the radio resources such as the usable frequency and the like to be allocated, for example, to each UE 3.

The processor 14 includes an estimating unit 31, a data-signal decoding unit 32, a control-signal decoding unit 33, a quality calculating unit 34, and a scheduler 35. The processor 14 further includes a data-signal generating unit 36, a control-signal generating unit 37, an RS generating unit 38, a data-signal encoding unit 39, a control-signal encoding unit 40, and an allocating unit 41.

The estimating unit 31 estimates a channel estimate value of a channel to be used from a channel state of a received signal based on an RS (Reference Signal) signal inserted into the received signal. The data-signal decoding unit 32 demodulates and decodes a data signal from the received signal based on the channel estimate value. The control-signal decoding unit 33 demodulates and decodes a control signal such as a DCI (Downlink Control Information) format from the received signal based on the channel estimate value. The DCI format is a control command of a DL (Down Link).

The quality calculating unit 34 calculates reception quality from the channel estimate value. The scheduler 35 generates allocation information for allocating the radio resources to be used for the cellular communication and the D2D communication to the UEs 3 accommodated in the eNB 2, based on reception quality of the quality calculating unit, a decoding result of the data-signal decoding unit 32, and a decoding result of the control-signal decoding unit 33. The scheduler 35 stores the generated allocation information in the memory 13.

The data-signal generating unit 36 generates a data signal according to a request. The control-signal generating unit 37 generates a control signal based on a decoding result of the data signal, a decoding result of the control signal, and the reception quality. Further, the control-signal generating unit 37 edits the contents of the control signal according to a request. The RS generating unit 38 generates an RS signal according to a request. The data-signal encoding unit 39 encodes and modulates the data signal generated by the data-signal generating unit 36. The control-signal encoding unit 40 encodes and modulates the generated control signal.

The allocating unit 41 allocates radio resources to the data signal, the control signal, and the RS signal based on allocation information. The control-signal generating unit 37 includes the allocation information generated by the scheduler 35 in the DCI format and transmits the DCI format to the UE 3.

The scheduler 35 determines whether the DUE 3B to be controlled is sharing the same radio resources with the CUE 3A. When the DUE 3B to be controlled is sharing the same radio resources with the CUE 3A, the scheduler 35 sets a control flag of the DUE 3B to ON. When the DUE 3B to be controlled is not sharing the same radio resources with the CUE 3A, the scheduler 35 sets the control flag of the DUE 3B to be controlled to OFF. For example, the control-signal generating unit 37 generates the DCI format for storing a UL grant for each UL grant. The UL grant is, for example, a control signal when permitting communication in the D2D communication. The control-signal generating unit 37 adds a control flag of the DUE 3B to be controlled to the DCI format, and transmits the DCI format added with the control flag from the transmitting unit 23 to the UE 3 in the UL grant.

FIG. 3 is a block diagram illustrating an example of the UE 3. The UE 3 illustrated in FIG. 3 includes an antenna 51, an RF circuit 52, a memory 53, and a processor 54. The antenna 51 transmits and receives a radio signal in the cellular communication or the D2D communication. The RF circuit 52 performs various types of signal processing with respect to a radio signal. The memory 53 is a region for storing various pieces of information such as allocation information from the eNB 2. The processor 54 controls the entire UE 3.

The RF circuit 52 includes a switching unit 61, a receiving unit 62, and a transmitting unit 63. The switching unit 61 is a switch that switches the receiving unit 62 and the transmitting unit 63 between the antenna 51 and the UE 3. The receiving unit 62 is a communication interface that receives a radio signal in the cellular communication or the D2D communication. The transmitting unit 63 is a communication interface that transmits a radio signal in the cellular communication or the D2D communication.

The processor 54 includes an estimating unit 71, a data-signal decoding unit 72, a control-signal decoding unit 73, a quality calculating unit 74, a data-signal generating unit 75, a control-signal generating unit 76, and an RS generating unit 77. Further, the processor 54 includes a data-signal encoding unit 78, a control-signal encoding unit 79, an allocating unit 80, and a communication control unit 81. The estimating unit 71 estimates a channel estimate value based on an RS signal inserted into the received signal. The data-signal decoding unit 72 demodulates and decodes a data signal from the received signal based on the channel estimate value. The control-signal decoding unit 73 demodulates and decodes a control signal from the received signal.

The quality calculating unit 74 calculates reception quality from the channel estimate value. The data-signal generating unit 75 generates a data signal according to a request. The control-signal generating unit 76 generates a control signal based on a decoding result of the data signal, a decoding result of the control signal, and the reception quality. The RS generating unit 77 generates an RS signal. The data-signal encoding unit 78 encodes and modulates the data signal. The control-signal encoding unit 79 encodes and modulates the control signal. The allocating unit 80 allocates radio resources to the data signal, the control signal, and the RS signal based on allocation information from the eNB 2 and transfers the data signal, the control signal, and the RS signal to the transmitting unit 63.

The communication control unit 81 decodes the control signal from the eNB 2 by the control-signal decoding unit 73 and determines whether the control flag for the equipment itself added to the DCI format of the control signal is ON. If the control flag is ON, the communication control unit 81 controls the transmission power of the transmitting unit 63.

The communication control unit 81 calculates a transmission power amount Pd in the D2D communication as a provisional transmission power amount by using (expression 1) of OL-TPC in the D2D communication (see 3GPP TS 36.213 v12.1.0).

$$P(i) = \min\left\{ \begin{array}{l} P_{MAX}(i), \\ 10\log_{10}(M(i)) + Po + \alpha \cdot PL + \Delta_{TF}(i) + f(i) \end{array} \right\}$$

i: sub-frame number

P(i): transmission power in sub-frame i $P_{MAX}(i)$: maximum transmission power defined in sub-frame i M(i): number of RBs allocated to PUSCH in sub-frame i $P_o$: pass loss between serving cell and UE α: pass loss compensation factor $\Delta_{TF}(i)$: value calculated by function of f(i) based on parameter instructed from upper layer Furthermore, the communication control unit 81 calculates a pass loss PLc between the eNB 2 and the UE 3. The pass loss PLc is calculated by subtracting an RSRP (Reference Signal Received Power) applied with a filter of an upper layer from the transmission power amount of the RS signal. The transmission power amount of the RS signal is notified in the upper layer from the eNB 2 to the UE 3. The communication control unit 81 calculates an estimated received power amount of the DUE 3B on the side of the eNB 2 by (Pd-PLc). The communication control unit 81 also determines whether the estimated received power amount (Pd-PLc) is equal to or less than a threshold Th. The threshold Th corresponds to a transmission power amount that does not cause signal interference with a UL signal of the CUE 3A between the eNB 2 and the UE 3, and is calculated in advance.

If the estimated received power amount (Pd-PLc) is equal to or less than the threshold Th, the communication control unit 81 does not need to reduce the calculated transmission power amount Pd, and controls the transmission power of the transmitting unit 63 so as to set the transmission power amount in the D2D communication to Pd. Further, if the estimated received power amount (Pd-PLc) is not equal to or less than the threshold Th, the communication control unit 81 controls the transmission power of the transmitting unit 63 so as to set the transmission power amount in the D2D communication to the threshold Th. If the control flag is not ON, the communication control unit 81 controls the transmission power of the transmitting unit 63 so as to set the transmission power amount in the D2D communication to Pd.

FIG. 4 is an explanatory diagram illustrating an example of a DCI format added with a control flag. The DCI format is for example a DCI format "0". A DCI format 90 illustrated in FIG. 4 includes a carrier indicator (0 or 3 bits) 91, a flag for format0/format1A differentiation (1 bit) 92, and a frequency hopping flag (1 bit) 93. The DCI format 90 also includes a resource block assignment and hopping recourse allocation (maximum 12 bits) 94, a modulation and coding scheme and redundancy version (5 bits) 95, and a new data indicator (1 bit) 96. The DCI format 90 further includes a TPC command for scheduled PUSCH (2 bits) 97, a cyclic shift for DM RS and OCC index (3 bits) 98, a UL index (2 bits) 99, and a downlink assignment index (DAI) (2 bits) 100. Further, the DCI format 90 includes CSI requests (1 or 2 bits) 101 and a resource allocation type (1 bit) 102. The control-signal generating unit 76 generates the DCI format 90 and adds control flags 103 for the number of UEs 3 to be controlled to the DCI format 90.

An operation of the radio system 1 according to the first embodiment is described next. The scheduler 35 of the eNB 2 determines whether the DUE 3B to be controlled is sharing the same radio resources with the CUE 3A. If the DUE 3B to be controlled is sharing the same radio resources with the CUE 3A, the scheduler 35 sets the control flag of the DUE 3B to ON. If the DUE 3B to be controlled is not sharing the same radio resources with the CUE 3A, the scheduler 35 sets the control flag of the DUE 3B to OFF. The control-signal generating unit 76 generates a DCI format that stores an UL grant for each UL grant permitting the D2D communication, and adds the control flag of the DUE 3B to be controlled to the generated DCI format. The transmitting unit 23 transmits the DCI format added with the control flag to the DUE 3B to be controlled.

Figure 5:
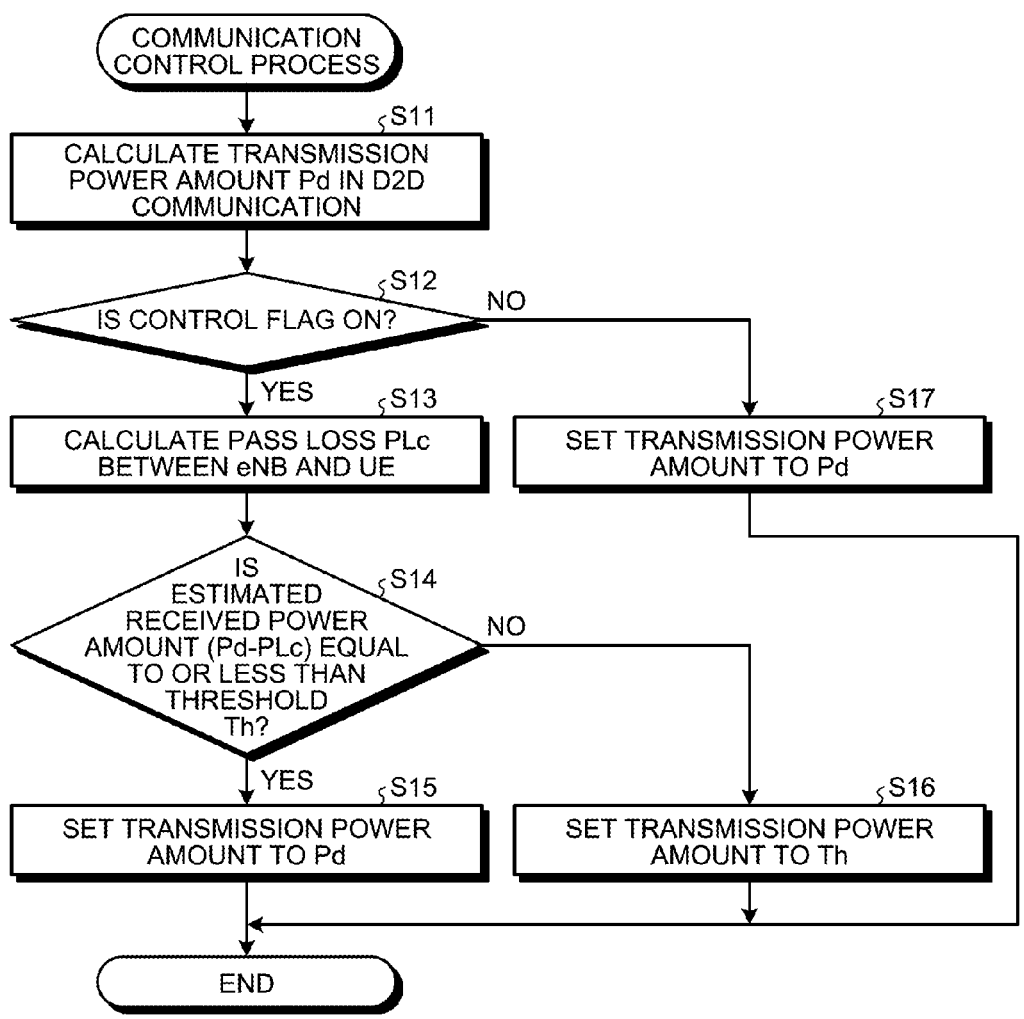
FIG. 5 is a flowchart illustrating an example of a processing operation of a DUE associated with a communication control process according to the first embodiment.

FIG. 5 is a flowchart illustrating an example of a processing operation of the DUE 3B associated with a communication control process according to the first embodiment. The communication control process illustrated in FIG. 5 is a process on the side of the DUE 3B that controls the transmission power in the D2D communication based on the control flag for the equipment itself.

In FIG. 5, the communication control unit 81 of the DUE 3B calculates the transmission power amount Pd in the D2D communication (Step S11) and determines whether the control flag 103 for the equipment itself which is added to the received DCI format 90 is ON (Step S12). If the control flag 103 for the equipment itself is ON (YES at Step S12), the communication control unit 81 calculates the pass loss PLc between the eNB 2 and the UE 3 (Step S13).

The communication control unit 81 determines whether the estimated received power amount (Pd-PLc) on the side of the eNB 2 obtained by subtracting the pass loss PLc from the transmission power amount Pd in the D2D communication is equal to or less than the threshold Th (Step S14). If the estimated received power amount (Pd-PLc) is equal to or less than the threshold Th (YES at Step S14), the communication control unit 81 controls the transmission power in the transmitting unit 63 so as to set the transmission power amount in the D2D communication to Pd and performs the D2D communication (Step S15) to end the processing operation illustrated in FIG. 5.

If the estimated received power amount (Pd-PLc) is not equal to or less than the threshold Th (NO at Step S14), the communication control unit 81 determines that there are effects of signal interference due to the D2D communication. The communication control unit 81 then controls the transmission power in the transmitting unit 63 so as to set the transmission power amount in the D2D communication to the threshold Th and performs the D2D communication (Step S16) to end the processing operation illustrated in FIG. 5.

If the control flag 103 for the equipment itself is not ON (NO at Step S12), the communication control unit 81 determines that there is no effect of signal interference due to the D2D communication. The communication control unit 81 then controls the transmission power in the transmitting unit 63 so as to set the transmission power amount in the D2D communication to Pd and performs the D2D communication (Step S17) to end the processing operation illustrated in FIG. 5. That is, the DUE 3B executes TPC (Transmission Power Control) between the DUE 3B facing thereto and itself, thereby realizing the D2D communication.

The DUE 3B that performs the communication control process illustrated in FIG. 5 controls the transmission power of the transmitting unit 63 so as to set the transmission power amount to Pd, if the control flag 103 is ON and the estimated received power amount (Pd-PLc) is equal to or less than the threshold Th. As a result, signal interference with the UL signal to the CUE 3A due to the D2D communication can be reduced.

If the control flag 103 is ON and the estimated received power amount (Pd-PLc) is not equal to or less than the threshold Th, the DUE 3B controls the transmission power of the transmitting unit 63 so as to set the transmission power amount to the threshold Th. As a result, signal interference with the UL signal to the CUE 3A due to the D2D communication can be reduced.

If the control flag 103 is OFF, the DUE 3B controls a transmission output of the transmitting unit 63 so as to set the transmission power amount to Pd.

If the DUE 3B to be controlled is sharing the same radio resources with the CUE 3A, the eNB 2 according to the first embodiment sets the control flag 103 of the DUE 3B to be controlled to ON. If the DUE 3B to be controlled is not sharing the same radio resources with the CUE 3A, the eNB 2 sets the control flag 103 of the DUE 3B to be controlled to OFF. The eNB 2 adds the control flags 103 for the number of DUEs 3B to be controlled to the DCI format 90 and notifies the DUEs 3B to be controlled of the DCI format 90. As a result, if the control flag 103 for the equipment itself is ON, the DUE 3B controls the transmission power in the D2D communication, thereby enabling to reduce signal interference with the cellular communication due to the D2D communication.

If the control flag 103 is ON and the estimated received power amount (Pd-PLc) is equal to or less than the threshold Th, the DUE 3B controls the transmission power of the transmitting unit 63 so as to set the transmission power amount in the D2D communication to Pd. As a result, signal interference with the UL signal of the CUE 3A due to the D2D communication can be reduced.

If the control flag 103 is ON and the estimated received power amount (Pd-PLc) is not equal to or less than the threshold Th, the DUE 3B controls the transmission power of the transmitting unit 63 so as to set the transmission power amount in the D2D communication to the threshold Th. As a result, signal interference with the UL signal of the CUE 3A due to the D2D communication can be reduced.

According to the first embodiment, because the same radio resources can be shared by the CUE 3A and the DUE 3B, the efficiency of use of the radio resources can be increased.

According to the first embodiment, when the DUE 3B to be controlled is sharing the same radio resources as the CUE 3A, transmission power control based on the estimated received power amount taking the pass loss PLc into consideration is executed. Accordingly, the frequency of unnecessary transmission power control can be reduced, as compared to a case where OL-TPC (Open Loop Transmission Power Control) is adopted. In the OL-TPC, even in an environment in which there is no signal interference with the CUE 3A, the transmission power control is executed at all times, and thus the throughput of the D2D communication decreases.

According to the first embodiment, even if the schedule status of the radio resources changes every second, signal interference with the cellular communication due to the D2D communication can be decreased depending on the status, without decreasing the transmission power in the D2D communication unnecessarily.

The eNB 2 according to the first embodiment switches the control flag 103 to ON/OFF depending on whether the DUE 3B to be controlled is sharing the same radio resources with the CUE 3A. However, the control flag 103 can be switched to ON/OFF depending on whether the DUE 3B is adjacent to the eNB 2. An embodiment in this case is described below as a second embodiment.

Second Embodiment

Figure 6:
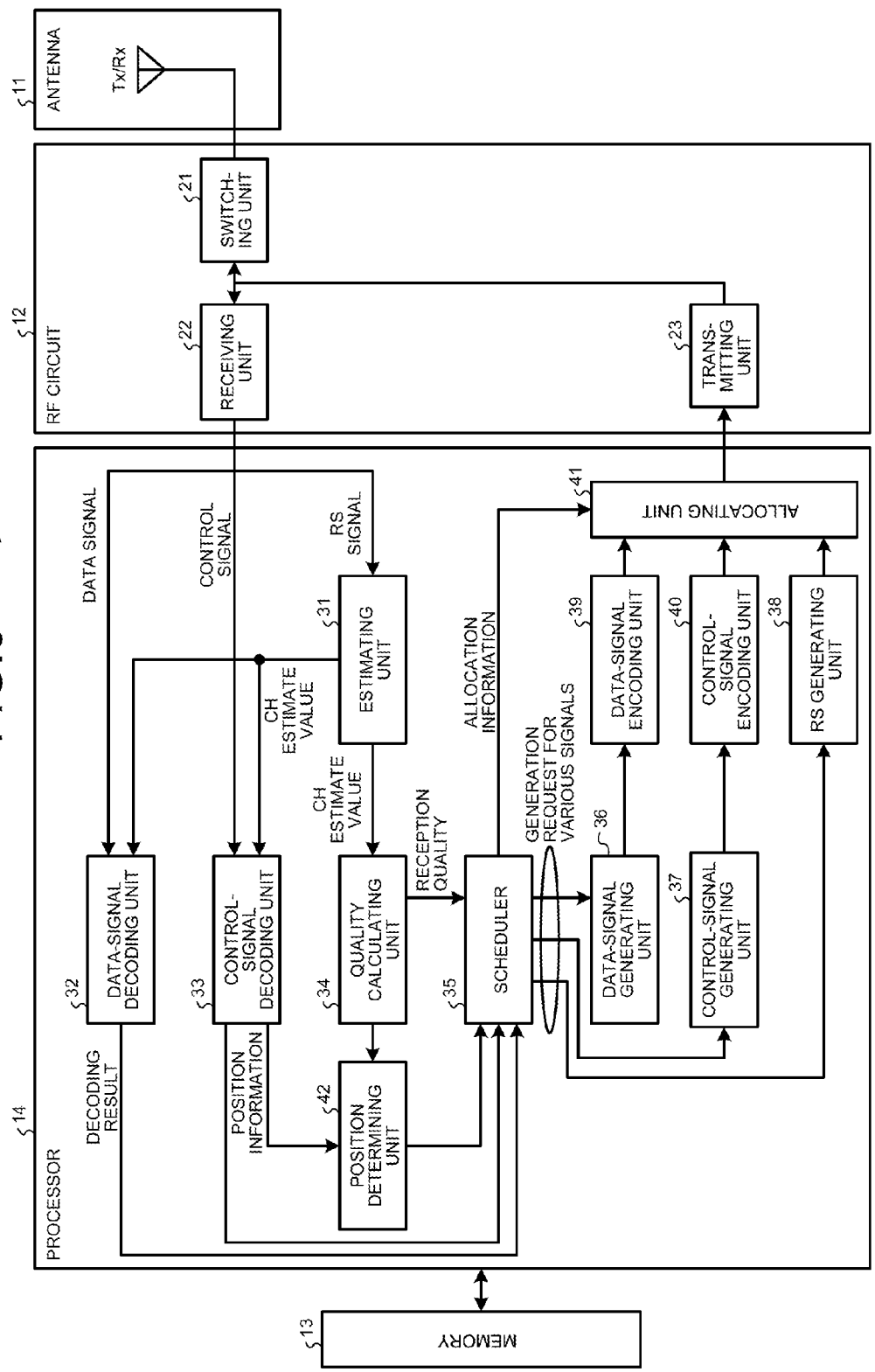
FIG. 6 is a block diagram illustrating an example of an eNB according to a second embodiment.

FIG. 6 is a block diagram illustrating an example of an eNB 2A according to the second embodiment. Configurations identical to those of the radio system 1 according to the first embodiment are denoted by like reference signs and redundant explanations of identical configurations and operations will be omitted. A point that the eNB 2A illustrated in FIG. 6 is different from the eNB 2 illustrated in FIG. 2 is that a position determining unit 42 is added thereto. The position determining unit 42 determines whether the DUE 3B is adjacent to the eNB 2A based on position information of the DUE 3B and the eNB 2A. If the DUE 3B is adjacent to the eNB 2A according to determination of the position determining unit 42, the scheduler 35 sets the control flag 103 for the DUE 3B to ON.

Figure 7:
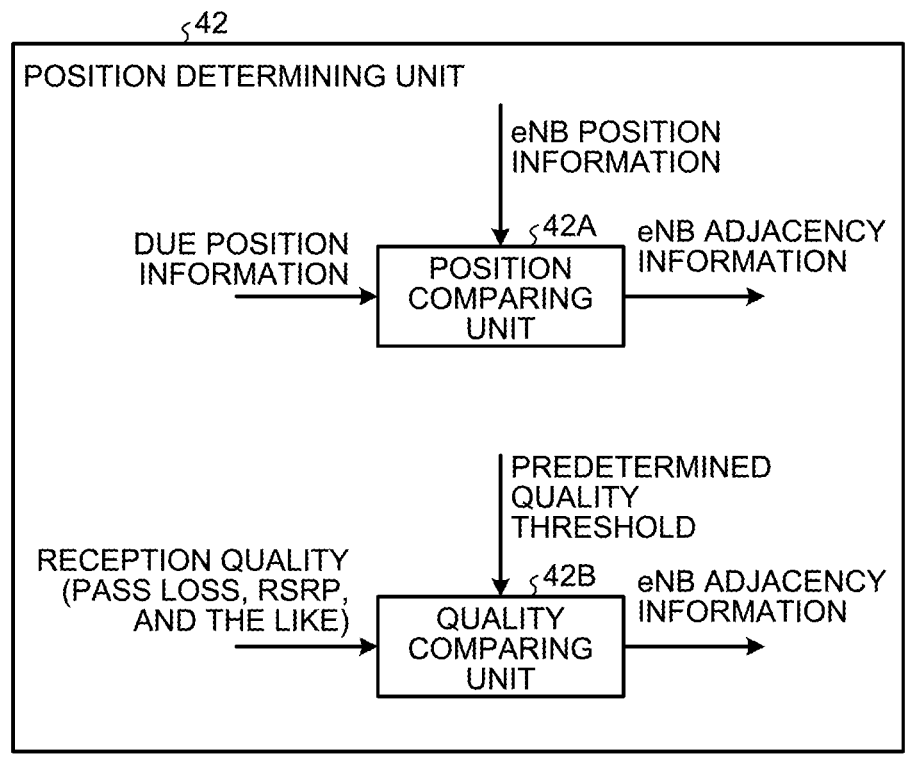
FIG. 7 is a block diagram illustrating an example of a position determining unit.

FIG. 7 is an explanatory diagram illustrating an example of the position determining unit 42. The position determining unit 42 includes a position comparing unit 42A and a quality comparing unit 42B. The position comparing unit 42A compares position information of the DUE 3B in the D2D communication with position information of the eNB 2A. If a distance therebetween is within a predetermined distance, the position comparing unit 42A determines that the DUE 3B and the eNB 2A are adjacent to each other. The quality comparing unit 42B compares, for example, the reception quality in the D2D communication such as the pass loss and RSRP (Reference Signal Received Power) with a quality threshold. If the reception quality has exceeded the quality threshold, the quality comparing unit 42B determines that the DUE 3B and the eNB 2A are adjacent to each other.

When the position determining unit 42 determines that the DUE 3B is adjacent to the eNB 2A, the scheduler 35 sets the control flag 103 for the DUE 3B to ON. When the position determining unit 42 determines that the DUE 3B is not adjacent to the eNB 2A, the scheduler 35 sets the control flag 103 for the DUE 3B to OFF. The control-signal generating unit 76 adds the control flags 103 for the number of DUEs 3B to be controlled to the DCI format 90. The transmitting unit 23 transmits the DCI format 90 added with the control flags 103 to the DUEs 3B to be controlled.

If the control flag 103 is ON and the estimated received power amount (Pd-PLc) is equal to or less than the threshold Th, the DUE 3B controls the transmission power of the transmitting unit 63 so as to set the transmission power amount in the D2D communication to Pd. As a result, signal interference with the UL signal to the CUE 3A due to the D2D communication can be reduced.

If the control flag 103 is ON and the estimated received power amount (Pd-PLc) is not equal to or less than the threshold Th, the DUE 3B controls the transmission power of the transmitting unit 63 so as to set the transmission power amount in the D2D communication to the threshold Th. As a result, signal interference with the UL signal to the CUE 3A due to the D2D communication can be reduced.

The eNB 2A according to the second embodiment sets the control flag 103 for the DUE 3B to be controlled to ON if the DUE 3B is adjacent to the eNB 2A, and sets the control flag 103 for the DUE 3B to be controlled to OFF if the DUE 3B is not adjacent to the eNB 2A. The eNB 2A adds the control flags 103 for the number of DUEs 3B to be controlled to the DCI format 90 and notifies the DUEs 3B to be controlled of the DCI format 90. As a result, the DUE 3B controls the transmission power in the D2D communication if the control flag 103 for the equipment itself is ON, thereby enabling to reduce signal interference with the cellular communication due to the D2D communication.

Furthermore, if the control flag 103 is ON and the estimated received power amount (Pd-PLc) is equal to or less than the threshold Th, the DUE 3B controls the transmission power of the transmitting unit 63 so as to set the transmission power amount in the D2D communication to Pd. As a result, signal interference with the UL signal of the CUE 3A due to the D2D communication can be reduced, even if the DUE 3B is adjacent to the eNB 2A.

If the control flag 103 is ON and the estimated received power amount (Pd-PLc) is not equal to or less than the threshold Th, the DUE 3B controls the transmission power of the transmitting unit 63 so as to set the transmission power amount in the D2D communication to the threshold Th. As a result, signal interference with the UL signal of the CUE 3A due to the D2D communication can be reduced, even if the DUE 3B is adjacent to the eNB 2A.

For example, even if the transmission power in the D2D communication is reduced between the DUEs 3B, a reception level may be low at a point in time when the UL signal from the CUE 3A near an end of a cell area reaches the eNB 2A, and may be affected by the D2D communication. According to the second embodiment, because the transmission power in the D2D communication is reduced even if the DUE 3B is adjacent to the eNB 2A, signal interference with the UL signal of the CUE 3A due to the D2D communication can be reduced.

According to the second embodiment, the control flag 103 for the DUE 3B to be controlled is set based on an adjacency relationship of whether the DUE 3B to be controlled is adjacent to the eNB 2A determined by the position determining unit 42. However, other than the adjacency relationship, the control flag 103 for the DUE 3B to be controlled may be set based on the presence of shared usage indicating whether the DUE 3B to be controlled is sharing the same radio resources with the CUE 3A, as in the first embodiment.

In the first and second embodiments described above, the control flags 103 for the number of UEs to be controlled are added to the DCI format 90. However, the control flag 103 can be allocated instead of the control information unnecessary in the D2D communication, for example, the new data indicator 96. The new data indicator 96 is control information being unnecessary, for example, if it is not retransmitted at the time of broadcast transmission.

In the first embodiment described above, the control flags 103 for the number of UEs to be controlled are added to the DCI format 90. However, if the number of UEs to be controlled increases, the number of control flags to be added to the DCI format also increases. Therefore, a control flag may be arranged in a dedicated format for each of the DUEs 3B to be controlled so that the DUE 3B can identify the control flag for the equipment itself by using CRC (Cyclic Redundancy Check) in the dedicated format. An embodiment in this case is described below as a third embodiment. Configurations identical to those of the radio system 1 according to the first embodiment are denoted by like reference signs and redundant explanations of identical configurations and operations will be omitted.

Third Embodiment

Figure 8:
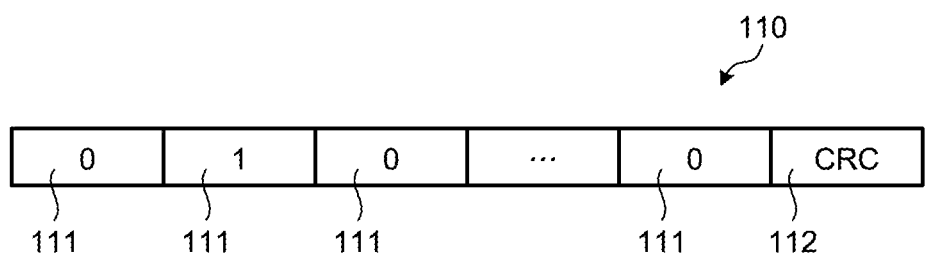
FIG. 8 is an explanatory diagram illustrating an example of a dedicated format added with a control flag according to a third embodiment.

FIG. 8 is an explanatory diagram illustrating an example of a dedicated format added with a control flag according to the third embodiment. A dedicated format 110 illustrated in FIG. 8 has a control flag 111 in a unit of bit set for each of the DUEs 3B to be controlled, and a CRC 112 set so as to be able to identify the control flag 111 for the equipment itself.

The scheduler 35 sequentially sets the control flags 111 of the DUEs 3B to be controlled in the dedicated format 110. The control-signal generating unit 37 sets the CRC 112 that enables to identify the control flags 111 of the DUEs 3B to be controlled in the dedicated format 110. Because the CRC 112 is scrambled by C-RNTI (Cell-Radio Network Temporary Identifier) allocated to each of the DUEs 3B, the control flag 111 for the equipment itself can be identified. Upon detection of a state change of the DUE 3B to be controlled, the control-signal generating unit 37 dynamically sets the control flag 111 of the DUE 3B to be controlled in the dedicated format 110 each time. The transmitting unit 23 transmits the dedicated format 110 to each of the DUEs 3B to be controlled.

When receiving the dedicated format 110, the DUE 3B acquires the control flag 111 for the equipment itself from the dedicated format 110 based on the CRC 112 in the dedicated format 110. If the control flag 111 for the equipment itself is ON and the estimated received power amount (Pd-PLc) is equal to or less than the threshold Th, the DUE 3B controls the transmission power of the transmitting unit 63 so as to set the transmission power amount in the D2D communication to Pd. As a result, signal interference with the UL signal of the CUE 3A due to the D2D communication can be reduced.

If the control flag for the equipment itself is ON and the estimated received power amount (Pd-PLc) is not equal to or less than the threshold Th, the DUE 3B controls the transmission power of the transmitting unit 63 so as to set the transmission power amount in the D2D communication to the threshold Th. As a result, signal interference with the UL signal of the CUE 3A due to the D2D communication can be reduced.

Furthermore, the eNB 2 dynamically transmits the control flag 111 to the DUE 3B to be controlled in the dedicated format 110. As a result, the control flag 111 can be transmitted to each of the DUEs 3B to be controlled depending on the change in the schedule status, as compared to a case where the control flag is transmitted to the DUE 3B to be controlled statically by adding the control flag 111 to the DCI format for each UL grant.

According to the first embodiment described above, the control flags 103 for the number of DUEs 3B to be controlled are added to the DCI format 90. However, the control flag can be set in a unit of sub-frame to be allocated to each DUE 3B, without setting the control flag 103 for each DUE 3B. An embodiment in this case is described below as a fourth embodiment. Configurations identical to those of the radio system 1 according to the first embodiment are denoted by like reference signs and redundant explanations of identical configurations and operations will be omitted.

Fourth Embodiment

FIG. 9 is an explanatory diagram illustrating an example of a DCI format added with a control flag according to the fourth embodiment. A control flag 103A in a unit of sub-frame is added to a DCI format 90A illustrated in FIG. 9. The scheduler 35 determines whether any one of the DUEs 3B to be controlled is sharing the same radio resources with the CUE 3A, of a plurality of UEs 3 allocated with a sub-frame. If the DUE 3B to be controlled is sharing the same radio resources with the CUE 3A, the scheduler 35 sets the control flag 103A in a unit of sub-frame to ON. If any one of the DUEs 3B to be controlled is not sharing the same radio resources with the CUE 3A, of the plurality of UEs 3 allocated with the sub-frame, the scheduler 35 sets the control flag 103A in a unit of sub-frame to OFF.

The control-signal generating unit 76 adds the control flag 103A in a unit of sub-frame to the DCI format 90A. The transmitting unit 23 transmits the DCI format 90A added with the control flag 103A to each of the DUEs 3B to be controlled.

If the control flag 103A is ON and the estimated received power amount (Pd-PLc) is equal to or less than the threshold Th, each of the DUEs 3B to be controlled controls the transmission power of the transmitting unit 63 so as to set the transmission power amount in the D2D communication to Pd. As a result, signal interference with the UL signal to the CUE 3A due to the D2D communication can be reduced.

If the control flag 103A is ON and the estimated received power amount (Pd-PLc) is not equal to or less than the threshold Th, each of the DUEs 3B to be controlled controls the transmission power of the transmitting unit 63 so as to set the transmission power amount in the D2D communication to the threshold Th. As a result, signal interference with the UL signal to the CUE 3A due to the D2D communication can be reduced.

Because the eNB 2 according to the fourth embodiment sets the control flag 103A in a unit of sub-frame, the eNB 2 can reduce the processing load in the process of setting the control flag 103A to the DCI format 90A, as compared to a case where the control flag 103 is set in a unit of UE 3. Further, because the control flag 103A needs only one bit, the DCI format 90A has a format configuration same as the DCI format "3", and thus the process of detecting the DCI format by the DUE 3B is unnecessary.

According to the fourth embodiment described above, the control flag 103A in a unit of sub-frame is added to the DCI format 90A. However, as described above, the control flag 103A in a unit of sub-frame can be allocated instead of the control information unnecessary in the D2D communication, for example, the new data indicator 96.

According to the fourth embodiment described above, the control flag 103A in a unit of sub-frame is added to the DCI format 90A. However, the present invention is not limited thereto, and an embodiment in this case is described below as a fifth embodiment. Configurations identical to those of the radio system 1 according to the first embodiment are denoted by like reference signs and redundant explanations of identical configurations and operations will be omitted.

Fifth Embodiment

FIG. 10 is an explanatory diagram illustrating an example of a DCI format added with a control flag according to the fifth embodiment. A control flag 103B is added to a DCI format 90B illustrated in FIG. 10 for each sub-frame. The scheduler 35 determines the presence of shared usage of the radio resources for each specified sub-frame. The scheduler 35 sets the control flag 103B respectively based on a determination result for each sub-frame. The control-signal generating unit 76 adds the control flag 103B to the DCI format 90B for each sub-frame. That is, the control-signal generating unit 76 adds the control flags 103B for the number of specified sub-frames to the DCI format 90B. The transmitting unit 23 transmits the DCI format 90B added with the control flag 103B for each sub-frame to the DUE 3B to be controlled.

If the control flag 103B for the sub-frame used by itself is ON and the estimated received power amount (Pd-PLc) is equal to or less than the threshold Th, each of the DUEs 3B to be controlled controls the transmission power of the transmitting unit 63 so as to set the transmission power amount in the D2D communication to Pd. As a result, signal interference with the UL signal to the CUE 3A due to the D2D communication can be reduced.

If the control flag 103B for the sub-frame used by itself is ON and the estimated received power amount (Pd-PLc) is not equal to or less than the threshold Th, each of the DUEs 3B to be controlled controls the transmission power of the transmitting unit 63 so as to set the transmission power amount in the D2D communication to the threshold Th. As a result, signal interference with the UL signal to the CUE 3A due to the D2D communication can be reduced.

The eNB 2 according to the fifth embodiment determines the presence of shared usage of the radio resources for each sub-frame and sets the control flag 103B for each determination result. The eNB 2 adds the control flag 103B for each sub-frame to the DCI format 90B, and notifies the DUEs 3B to be controlled of the DCI format 90B. As a result, the DUEs 3B to be controlled can recognize the control flag 103B for the future sub-frame beforehand. If the control flag 103B for the sub-frame used by itself, of the control flags 103B for the respective sub-frames, is ON and the estimated received power amount (Pd-PLc) is equal to or less than the threshold Th, the DUE 3B to be controlled controls the transmission power of the transmitting unit 63 so as to set the transmission power amount to Pd. As a result, signal interference with the UL signal to the CUE 3A due to the D2D communication can be reduced.

If the control flag 103B for the sub-frame used by itself, of the control flags for the respective sub-frames, is ON and the estimated received power amount (Pd-PLc) is not equal to or less than the threshold Th, the DUE 3B to be controlled controls the transmission power of the transmitting unit 63 so as to set the transmission power amount to the threshold Th. As a result, signal interference with the UL signal to the CUE 3A due to the D2D communication can be reduced.

According to the first embodiment described above, if the control flag is ON and the estimated received power amount (Pd-PLc) is equal to or less than the threshold Th, the DUE 3B controls the transmission power of the transmitting unit 63 so as to set the transmission power amount in the D2D communication to Pd. However, the present invention is not limited thereto, and an embodiment in this case is described as a sixth embodiment. Configurations identical to those of the radio system 1 according to the first embodiment are denoted by like reference signs and redundant explanations of identical configurations and operations will be omitted.

Sixth Embodiment

FIG. 11 is a flowchart illustrating an example of a processing operation of the DUE 3B associated with the communication control process according to the sixth embodiment. In FIG. 11, the communication control unit 81 of the DUE 3B calculates the transmission power amount Pd in the D2D communication (Step S21), and determines whether the control flag 103 is ON (Step S22). If the control flag 103 is ON (YES at Step S22), the communication control unit 81 stops the D2D communication (Step S23) to end the processing operation illustrated in FIG. 11. The communication control unit 81 de-actuates the data-signal generating unit 75, the control-signal generating unit 76, and the RS generating unit 77 in the D2D communication to stop the D2D communication.

If the control flag 103 is not ON (NO at Step S22), the communication control unit 81 controls the transmission power of the transmitting unit 63 so as to set the transmission power amount in the D2D communication to Pd and performs the D2D communication (Step S24) to end the processing operation illustrated in FIG. 11.

If the control flag 103 is ON, the DUE 3B that performs the communication control process illustrated in FIG. 11 stops the D2D communication without controlling the transmission power. As a result, signal interference with the UL signal to the CUE 3A due to the D2D communication can be reduced.

If the control flag 103 is ON, the DUE 3B according to the fifth embodiment stops the D2D communication without controlling the transmission power. As a result, signal interference with the UL signal to the CUE 3A due to the D2D communication can be reduced.

According to the first embodiment described above, if the control flag 103 is ON and the estimated received power amount (Pd-PLc) is equal to or less than the threshold Th, the DUE 3B controls the transmission power of the transmitting unit 63 so as to set the transmission power amount in the D2D communication to Pd. However, the present invention is not limited thereto, and an embodiment in this case is described as a seventh embodiment. Configurations identical to those of the radio system 1 according to the first embodiment are denoted by like reference signs and redundant explanations of identical configurations and operations will be omitted.

Seventh Embodiment

FIG. 12 is a flowchart illustrating an example of a processing operation of the DUE 3B associated with the communication control process according to the seventh embodiment. In FIG. 12, the communication control unit 81 in the DUE 3B calculates the transmission power amount Pd in the D2D communication (Step S31) and determines whether the control flag 103 is ON (Step S32). If the control flag 103 is ON (YES at Step S32), the communication control unit 81 calculates the pass loss PLc between the eNB 2A and the UE 3 (Step S33).

The communication control unit 81 determines whether the estimated received power amount (Pd-PLc) is equal to or less than the threshold Th (Step S34). If the estimated received power amount (Pd-PLc) is equal to or less than the threshold Th (YES at Step S34), the communication control unit 81 controls the transmission power in the transmitting unit 63 so as to set the transmission power amount in the D2D communication to Pd and performs the D2D communication (Step S35) to end the processing operation illustrated in FIG. 12.

If the estimated received power amount (Pd-PLc) is not equal to or less than the threshold Th (NO at Step S34), the communication control unit 81 stops the D2D communication (Step S36) to end the processing operation illustrated in FIG. 12. The communication control unit 81 de-actuates the data-signal generating unit 75, the control-signal generating unit 76, and the RS generating unit 77 to stop the D2D communication.

If the control flag 103 is not ON (NO at Step S32), the communication control unit 81 controls the transmission power in the transmitting unit 63 so as to set the transmission power amount in the D2D communication to Pd and performs the D2D communication (Step S37) to end the processing operation illustrated in FIG. 12.

If the control flag 103 is ON and the estimated received power amount (Pd-PLc) is equal to or less than the threshold Th, the DUE 3B that performs the communication control process illustrated in FIG. 12 controls the transmission power in the transmitting unit 63 so as to set the transmission power amount in the D2D communication to Pd. As a result, signal interference with the UL signal of the CUE 3A due to the D2D communication can be reduced.

If the control flag 103 is ON and the estimated received power amount (Pd-PLc) is not equal to or less than the threshold Th, the DUE 3B stops the D2D communication. As a result, signal interference with the UL signal of the CUE 3A due to the D2D communication can be reduced.

If the control flag 103 is ON and the estimated received power amount (Pd-PLc) is equal to or less than the threshold Th, the DUE 3B according to the seventh embodiment controls the transmission power in the transmitting unit 63 so as to set the transmission power amount in the D2D communication to Pd. As a result, signal interference with the UL signal of the CUE 3A due to the D2D communication can be reduced.

If the control flag 103 is ON and the estimated received power amount (Pd-PLc) is not equal to or less than the threshold Th, the DUE 3B stops the D2D communication. As a result, signal interference with the UL signal of the CUE 3A due to the D2D communication can be reduced.

In the embodiments described above, for convenience sake of explanation, it has been described that the UE 3 is a mobile station that can switch the functions of the CUE 3A and the DUE 3B. However, for example, the embodiments described above are applicable to a mobile station having only the function as the DUE 3B.

The eNB 2 according to the present embodiments has been described as an integrated apparatus having a radio function and a control function. However, the eNB 2 is not limited thereto, and a radio device and a control device can be individually formed to configure the eNB. In this case, the radio device incorporates the antenna 11 and the RF circuit 12 therein, and the control device incorporates the memory 13 and the processor 14 therein.

Respective constituent elements of respective units illustrated in the drawings do not necessarily have to be physically configured in the way as illustrated in these drawings. That is, the specific mode of distribution and integration of respective units is not limited to the illustrated ones and all or a part of these units can be functionally or physically distributed or integrated in an arbitrary unit, according to various kinds of load and the status of use.

Furthermore, all or an arbitrary part of each processing function performed by respective devices can be realized by a CPU (Central Processing Unit) (or a microcomputer such as an MPU (Micro Processing Unit) and an MCU (Micro Controller Unit)). Further, all or an arbitrary part of the respective processing function can be realized by a program analyzed and executed in the CPU (or a microcomputer such as an MPU and an MCU), or realized as hardware by a wired logic.

In one mode, it is possible to reduce the effects of signal interference with first communication due to second communication.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A base station apparatus comprising a processor, wherein the processor executes a process comprising:
    obtaining information indicating a radio status of each mobile station apparatus relevant to first communication in which radio communication is performed between the mobile station apparatuses via the base station apparatus, and second communication in which radio communication is directly performed between the mobile station apparatuses without via the base station apparatus; and
    notifying, based on the obtained information, the mobile station apparatuses that perform the second communication of control information for controlling the second communication, the control information for controlling the second communication being information relevant to switching of transmission power control methods, the mobile station apparatus deciding transmission power by taking a fixed value or transmission power by taking a pass loss, based on the information relevant to the switching.

2. The base station apparatus according to claim 1, wherein the information indicating the radio status is information of presence of shared usage indicating whether the mobile station apparatuses in the second communication are sharing same radio resources with the mobile station apparatuses in the first communication.

3. The base station apparatus according to claim 1, wherein the information indicating the radio status is information indicating whether position information of the mobile station apparatus in the second communication is present within a predetermined distance from the own apparatus.

4. The base station apparatus according to claim 1, wherein the notifying includes notifying the mobile station apparatus that performs the second communication of the control information by using a control command in the second communication.

5. The base station apparatus according to claim 1, wherein the notifying includes notifying the mobile station apparatus that performs the second communication of the control information collectively in a unit of the mobile station apparatus.

6. The base station apparatus according to claim 1, wherein the notifying includes notifying the mobile station apparatus that performs the second communication of the control information in a unit of sub-frame allocated to each mobile station apparatus in the second communication.

7. A mobile station apparatus comprising a processor, wherein the processor executes a process comprising:
    receiving control information for controlling second communication from a base station apparatus, the control information being based on information indicating a radio status of each mobile station apparatus relevant to first communication in which radio communication is performed between the mobile station apparatuses via the base station apparatus, and the second communication in which radio communication is directly performed between the mobile station apparatuses without via the base station apparatus, the control information for controlling the second communication being information relevant to switching of transmission power control methods, the mobile station apparatus deciding transmission power by taking a fixed value or transmission power by taking a pass loss, based on the information relevant to the switching; and
    controlling a radio output in the second communication, upon reception of the control information.

8. The mobile station apparatus according to claim 7, wherein the controlling includes controlling transmission power in the second communication, upon reception of the control information.

9. The mobile station apparatus according to claim 7, wherein the controlling includes stopping a radio output in the second communication, upon reception of the control information.

10. A radio communication system comprising a mobile station apparatus and a base station apparatus that performs radio communication with the mobile station apparatus, the radio communication system performing first communication or second communication, radio communication in the first communication being performed between the mobile station apparatuses via the base station apparatus, radio communication in the second communication being directly performed between the mobile station apparatuses without via the base station apparatus, wherein
    the base station apparatus includes a control unit that notifies the mobile station apparatuses that perform the second communication of control information for controlling the second communication,
    the control information for controlling the second communication is information relevant to switching of transmission power control methods, and
    the mobile station apparatus decides transmission power by taking a fixed value or transmission power by taking a pass loss, based on the information relevant to the switching.

11. The radio communication system according to claim 10, wherein the control information for controlling the second communication is information relevant to transmission power.

12. The radio communication system according to claim 10, wherein the mobile station apparatus stops a radio output in the second communication, upon reception of the control information.

13. A communication control method of a base station apparatus, the communication control method comprising:
    obtaining information indicating a radio status of each of mobile station apparatuses relevant to first communication in which radio communication is performed between the mobile station apparatuses via the base station apparatus, and the second communication in which radio communication is directly performed between the mobile station apparatuses without via the base station apparatus; and notifying the mobile station apparatus that performs second communication of control information for controlling the second communication, based on the obtained information, the control information for controlling the second communication being information relevant to switching of transmission power control methods, the mobile station apparatus deciding transmission power by taking a fixed value or transmission power by taking a pass loss, based on the information relevant to the switching.

14. A communication control method of a mobile station apparatus, the communication control method comprising:

receiving control information for controlling second communication from a base station apparatus, the control information being based on information indicating a radio status of each of the mobile station apparatuses relevant to first communication in which radio communication is performed between the mobile station apparatuses via the base station apparatus, and the second communication in which radio communication is directly performed between the mobile station apparatuses without via the base station apparatus, the control information for controlling the second communication being information relevant to switching of transmission power control methods, the mobile station apparatus deciding transmission power by taking a fixed value or transmission power by taking a pass loss, based on the information relevant to the switching; and controlling a radio output in the second communication, upon reception of the control information.

* * * * *